C. R. FOUNTAIN.
TRANSMISSION GEARING.
APPLICATION FILED JUNE 27, 1916.

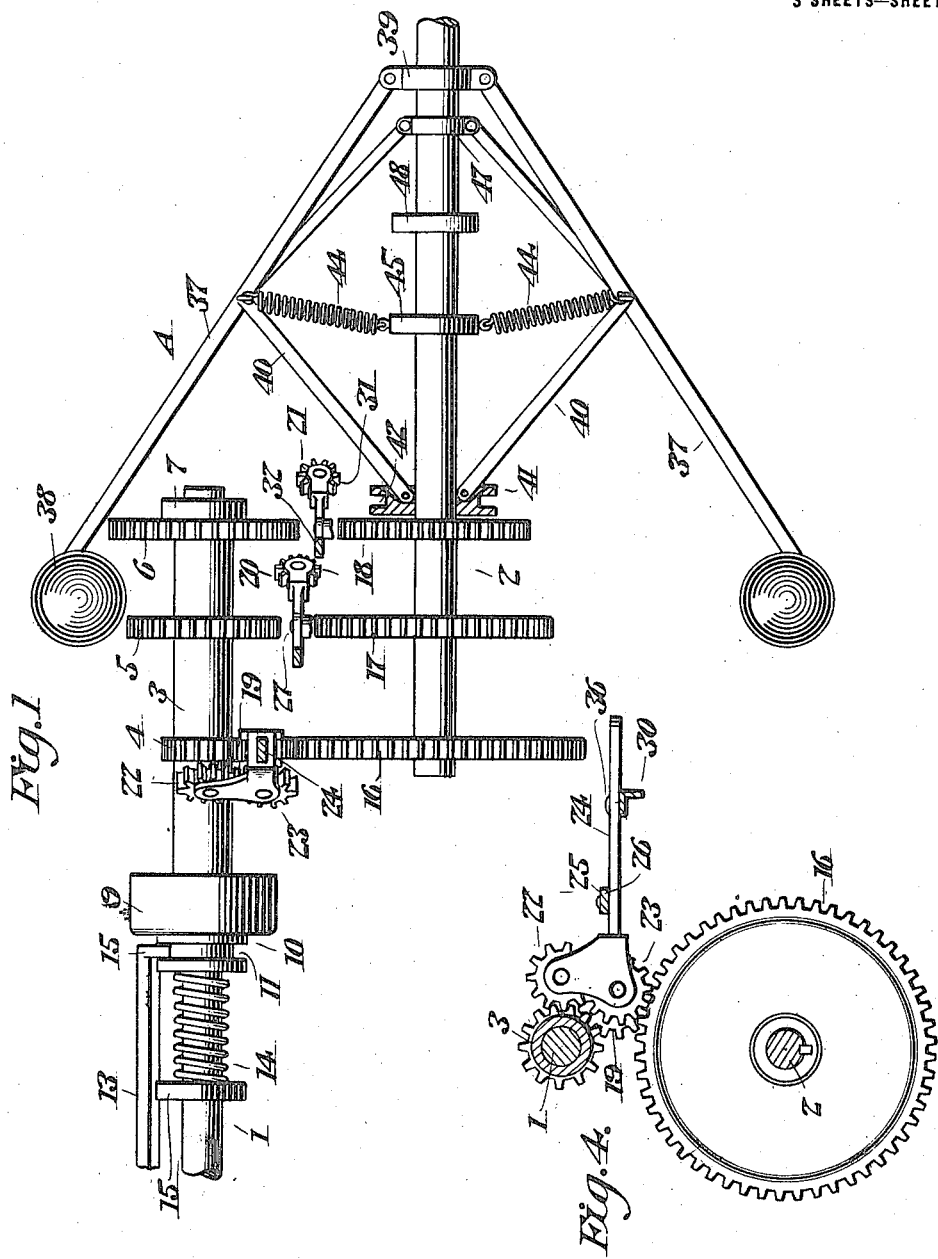

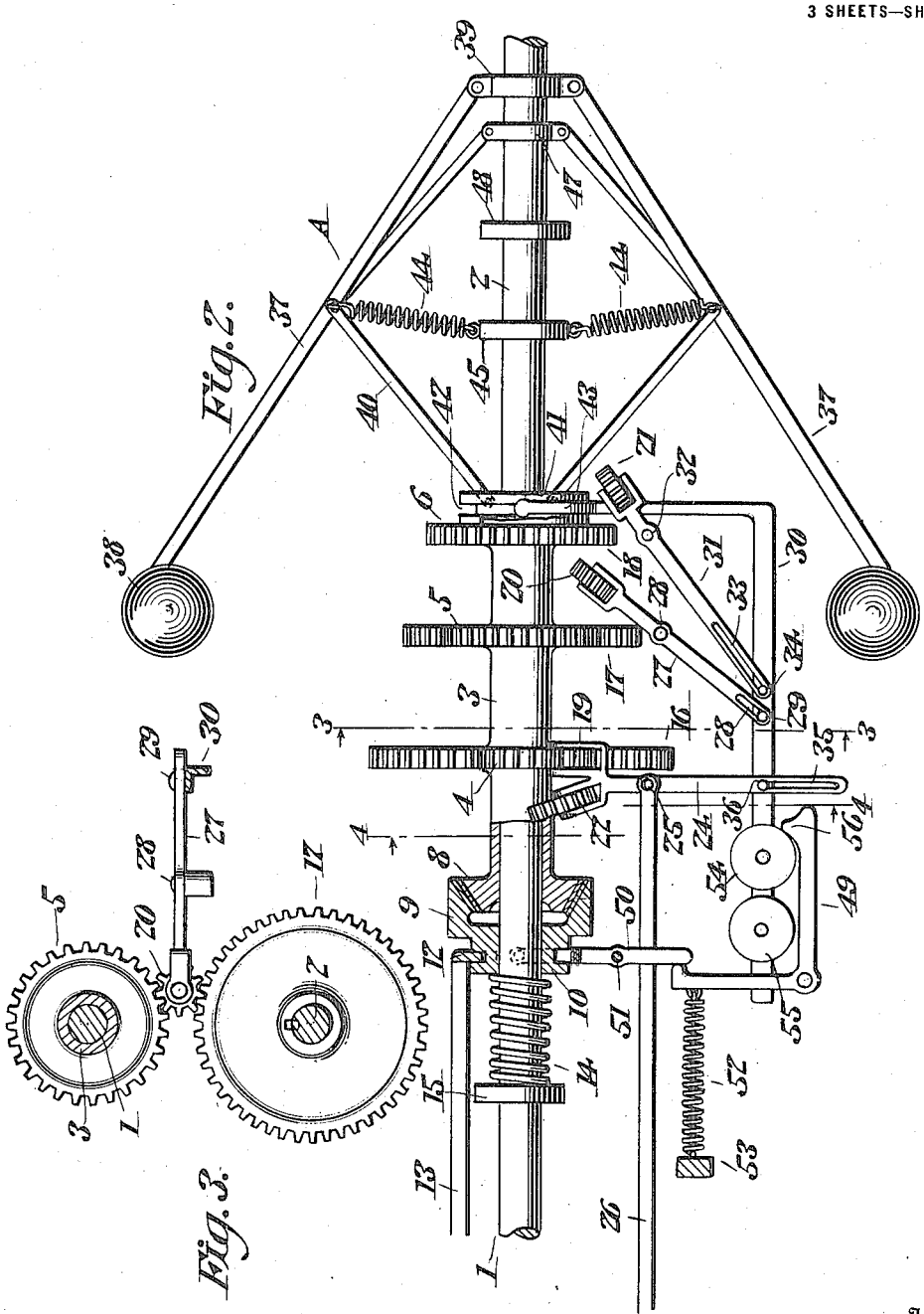

1,233,043.

Patented July 10, 1917.

Witnesses
M. D. Slifer

Inventor
C. R. Fountain
By Victor J. Evans
Attorney

UNITED STATES PATENT OFFICE.

CLAUDE R. FOUNTAIN, OF ATHENS, GEORGIA.

TRANSMISSION-GEARING.

1,233,043.　　　　　Specification of Letters Patent.　　　Patented July 10, 1917.

Application filed June 27, 1916.　Serial No. 106,203.

*To all whom it may concern:*

Be it known that I, CLAUDE R. FOUNTAIN, a citizen of the United States, residing at Athens, in the county of Clarke and State of Georgia, have invented new and useful Improvements in Transmission-Gearings, of which the following is a specification.

This invention relates to transmission gearing and particularly to means whereby the shiftable gears of the mechanism are automatically shifted in accordance with the speed of the load shaft or the shaft which ordinarily extends from the transmission gearing to the differential gearing of the driving axle.

The object of the present invention is to provide means whereby the necessary members of the transmission gearing are automatically shifted from a lower to a higher or from a higher to a lower speed without any attention on the part of the operator of the machine. In the operation of the mechanism, after the vehicle reaches a certain speed the transmission gearing is automatically shifted from first speed to second speed and thereafter when the load shaft again reaches a certain predetermined speed, the transmission gearing is automatically shifted from second speed to high speed. Again as the speed of the load shaft decreases, the gears are shifted from high speed to second or intermediate speed and subsequently, if the load demands it, from second or intermediate speed to low speed. Provision is also made whereby the direction of movement of the vehicle may be reversed.

The broad object of the invention is to eliminate the shifting of gears by hand and to substitute therefor means whereby the gears are shifted automatically in accordance with the speed of the vehicle and the load shaft.

With the above and other objects in view, the invention consists in the novel construction, combination and arrangement of parts, as herein described, illustrated and claimed.

In the accompanying drawings:—

Figure 1 is a view partly in longitudinal section, showing the automatic gear shifting mechanism of this invention, certain parts thereof being shown in elevation.

Fig. 2 is a view taken at right angles to Fig. 1.

Fig. 3 is a section on the line 3—3 of Fig. 2 looking in the direction of the arrow.

Fig. 4 is a section on the line 4—4 of Fig. 2 looking in the direction of the arrow.

Figure 5:
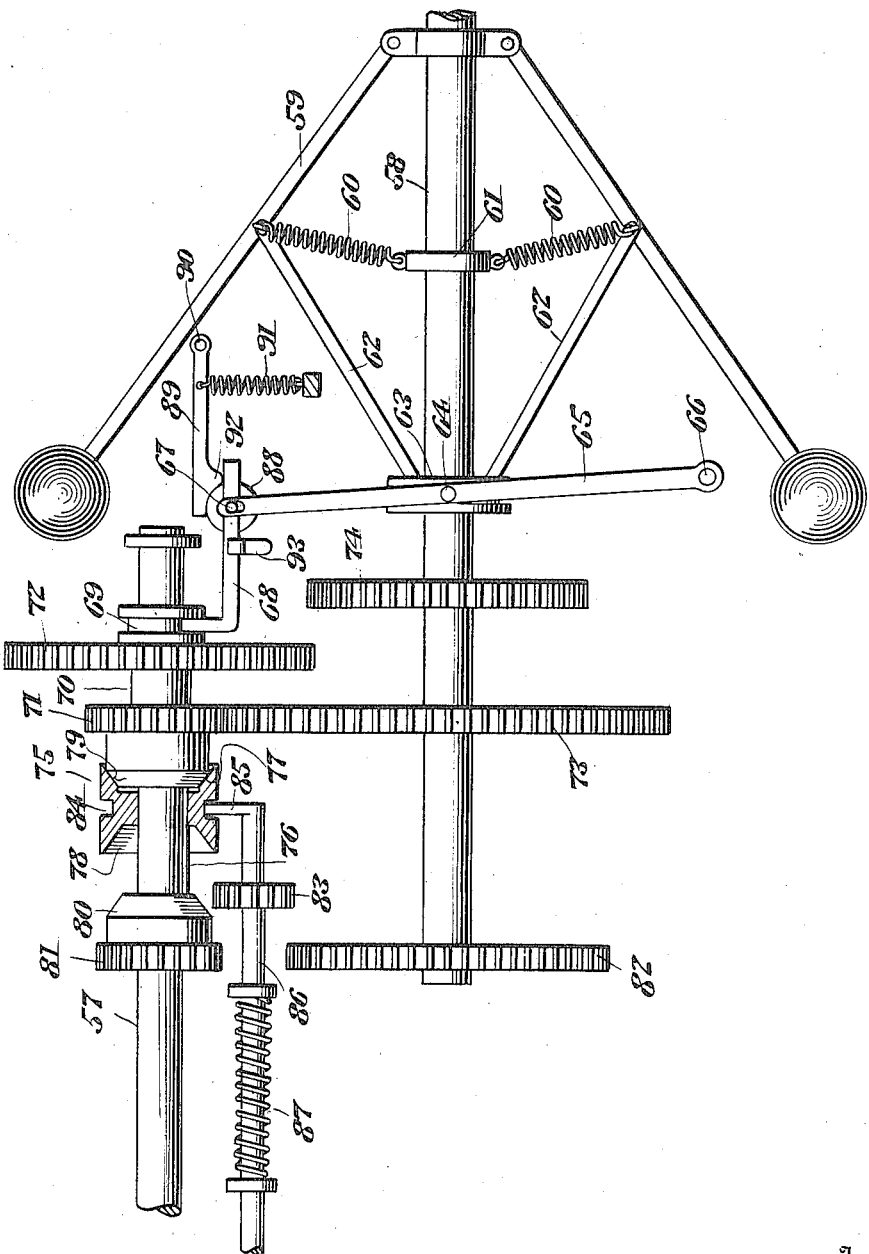
Fig. 5 is a view similar to Fig. 2 showing a simplified form of transmission gearing.

Referring to the drawings 1 designates the driving shaft and 2 the driven shaft. The driving shaft 1, in automobile practice, will constitute either the engine shaft or an extension thereof, while the driven shaft 2 will constitute what is known as the drive shaft or load shaft which extends from the transmission gearing back to the differential gearing on the rear axle which constitutes the driving axle of the machine.

In carrying out the present invention, I provide in connection with the driving shaft 1 a tubular shaft or sleeve 3 which is normally loose on the driving shaft 1. The shaft or sleeve 3 has fast thereon gears 4, 5 and 6 all of which therefore rotate in unison, being connected together in fixed relation to each other by means of the shaft or sleeve 3. At the end of the shaft 1 there is a stop 7 to prevent movement of the sleeve 3 in that direction. The sleeve at the front end is provided with a clutch head 8 with which a clutch 9 of any suitable description is adapted to coöperate for the purpose of connecting the sleeve 3 to the shaft 1 and disconnecting the same therefrom.

The clutch 9 comprises a collar or body portion 10 having an annular groove 11 therein which receives a fork 12 at the extremity of a clutch operating connection 13 accessible to the driver and ordinarily connected to a pedal (not shown) but arranged in the usual place within reach of the driver's foot. Back of the collar 10 is a clutch engaging spring 14 which operates to hold the clutch in its clutching position, said spring 14 being backed by a stop 15 shown in the form of a collar fast on the shaft 1.

The driven shaft 2 has fast thereon gears 16, 17 and 18 all of which therefore rotate in unison. The gear 16 is arranged opposite the gear 4, the gear 17 opposite the gear 5, and the gear 18 opposite the gear 6. Motion is transmitted from the gear 4 to the gear 16 in a forward direction by means of a motion transmitting gear 19. Motion is transmitted from the gear 5 to the gear 17 by a motion transmitting gear 20 and the gear 18 is driven from the gear 6 by means of a motion transmitting gear 21. The reverse movement is imparted to the shaft 2 by means of two reversing gears 22 and 23 which are adapted to be interposed between the gears 4 and 16. The gears 22 and 23 and also the gear 19 are carried by a shiftable support 24 shown in the form of a lever pivotally mounted at 25 on a longitudinally movable member 26 which is stationary at all times except when reverse drive is needed as hereinafter explained. The main transmitting gear 20 is journaled in a supporting member 27 in the form of a lever pivotally mounted at 28 on the frame or casing of the transmission gearing and having a slot 28 which is engaged by a pin 29 on a gear shifting member 30. The gear 21 is journaled on a supporting member 31 which is pivotally mounted at 32 in the frame or casing and formed with a slot 33 which engages another pin 34 on the gear shifting member 30. The supporting member 24 is likewise formed with a longitudinal slot 35 which engages another pin 36 on the gear shifting member.

Governor mechanism designated generally at A and shown as comprising a plurality of governor arms 37 and weights 38 is mounted upon the driven shaft 2, the arms 37 being shown as pivotally connected to a collar 39 fast on the shaft 2. Pivotal links 40 connect the arms 37 with a sliding collar 41 movable longitudinally of the shaft 2, said collar 40 being formed with an annular groove 42 to receive the forked end of an arm 43 on the gear shifting member 30. Governor springs 44 connect the arms 37 to a sliding stop collar 47 slidable on the shaft 2. 48 represents a collar fast on the shaft 2 and forming a stop to limit the movement of the slidable collar 47 for the purpose of limiting the outward movement of the weighted arms 37 in order to prevent further shifting of the gears when the transmission mechanism as a whole is in high speed.

49 designates a clutch shifting lever which is illustrated as of the bell crank type, one arm of said lever being arranged to strike against one arm of another lever 50 which is pivotally mounted between its ends at 51, the other arm of said lever being forked to engage the groove 11 of the collar 10 above described. The lever 49 is normally held in the position shown in Fig. 2 by means of a coiled contractile spring 52 one end of which is attached to the lever 49 and the other end to a fixed point at 53.

In the preferred embodiment of the invention, two rollers 54 and 55 are carried by the gear shifting member 30 and they coöperate with a projection 56 on one arm of the lever 49 which arm is normally parallel to the path of movement of the gear shifting member 30.

In view of the foregoing description, taken in connection with the accompanying drawings, the operation of the device will now be understood to be as follows: In Figs. 1 and 2 the gears are shown as arranged for low speed, the motion transmitting gear 19 meshing with the gears 4 and 16. Therefore, when the clutch 9 is moved to its operative position, rotary motion is imparted by the shaft 1 through the medium of said clutch to the sleeve 3 thereupon imparting motion through the gears 4, 19 and 16 to the driven shaft 2. After the vehicle reaches a certain predetermined speed, the rapid rotation of the driven shaft 2 throws the governor mechanism into operation and as the arms 37 move outwardly by centrifugal force, the collar 41 is moved toward the collar 45 carrying with it the arm 43 of the gear shifting member 30 with the result that the gear 19 is shifted out of engagement with the gears 4 and 16 while at the same time the gear 20 is shifted into mesh with the gears 5 and 17. During this operation, the roller 54 coöperating with the projection 56 rocks the lever 49 and through the medium of the lever 50, the clutch 9 is released, thus during the operation of shifting the gears, the clutch is released, as soon as the gears have been shifted to the position last described, the roller 54 passes beyond the projection 56 and thereupon the lever 49 is returned to its normal position shown in Fig. 2 while the clutch is again thrown into operation by the action of the spring 14. The vehicle now proceeds on second speed.

Again when the driven shaft 2 reaches a predetermined speed, the same operation of the governor mechanism takes place, the collar 41 being advanced still farther toward the collar 45. The gear shifting member 13 is moved correspondingly in the same direction causing the roller 55 to coöperate with the projection 56 thereby rocking the lever 49 and again releasing the clutch 9. Simultaneously with this movement, the gear 20 is thrown out of engagement with the gears 5 and 17 and the gear 21 is thrown into mesh with the gears 6 and 18. The mechanism is now in high speed. When the speed of the load shaft 22 decreases, the arms 37 of the governor mechanism are drawn inwardly by the springs 44 and thereby the collar 41 is moved away from the collar 45. This serves to shift the gear 21 out of operation and shift the gear 20 into operation, at the same time releasing the clutch 9 which is subsequently and automatically returned to its engaging position by the spring 14. Upon a still further reduction of speed of the shaft 2, the gear 20 is shifted out of its operative position and the gear 19 is shifted into its operative position so that the mechanism is returned to low speed, the clutch being automatically released and again set in the same manner as previously described.

In order to reverse the direction of rotation of the shaft 2 with relation to the shaft 1, the two reversing gears 22 and 23 are shifted into mesh with the gears 4 and 16 by means of the member 26 which will ordinarily be connected to a reverse lever within reach of the operator of the machine.

The mechanism hereinabove described is particularly adapted to motor trucks and the like, enabling a motor of comparatively small power to be utilized and to accomplish the purpose of a more powerful and flexible motor such as is now used and which requires the judgment of the operator and constant attention on his part. Under the arrangement hereinabove described, the objectionable frequent shifting of gears by manual dexterity is eliminated. This mechanism is also adapted to machines in shops where the load on any machine varies through wide limits.

Under the arrangement of gearing illustrated in Fig. 5, 57 designates the driving shaft and 58 the driven shaft carrying the governor arms 59 corresponding with the governor arms previously described and which are connected by springs 60 to a collar 61 on the driven shaft. Links 62 connect the arms 59 to a collar 63 slidable on the driven shaft 58 and having a jointed connection at 64 with a lever 65 fulcrumed at 66 at one end thereof. The free end of the lever has a pin and slot connection 67 with a gear shifting member 68 which engages an annular groove 69 in a sliding sleeve 70 movable longitudinally of the driving shaft 57 and having fast thereon gears 71 and 72. The gear 71 is adapted to be shifted into and out of engagement with a mating gear 73 on the driven shaft 58, while the gear 72 is adapted to be moved into and out of mesh with a mating gear 74 on said driven shaft. The sleeve 70 is, like the sleeve 3 above described, loose on the driving shaft 57 but is adapted to be connected thereto and disconnected therefrom by means of a clutch 75 connected to the shaft 57 by a key 76 but slidable longitudinally of the shaft and formed with two clutch faces 77 and 78 adapted to respectively engage clutch faces 79 and 80, the clutch face 79 being formed on the sleeve 70, while the clutch face 80 has a fixed relation to a reversing gear 81 on the driving shaft 57, the gear 80 being adapted to actuate a gear 82 on the driven shaft 58 by means of a pinion or gear 83 adapted to be moved into or out of a position between the gears 81 and 82.

The clutch 75 is formed with an annular groove 84 to receive the fork 85 of a shifting rod 86 which is pressed to the right in Fig. 5 by means of a coiled expansion spring 87 so as to force the clutch 75 into engagement with the clutch face 79 of the sleeve 70 and to cause said clutch 75 to follow up the sleeve, when the latter is shifted by the member 68, the latter being of course actuated by the lever 65 which is controlled by the governor mechanism. A foot pedal may be connected to the shifting rod 86 for the purpose of moving the clutch 75 and the gear 83 to the left in Fig. 5 so as to throw the reversing gears into operation simultaneously with the clutching action between the clutch 75 and the clutch face 80.

At its free end the lever 65 carries a latch roller 88 which engages a latch 89 pivotally mounted at 90 and held against the latch roller 88 by means of a spring 91. The latch 89 is formed with a projection 92 serving to hold the roller 88 at either limit of its movement, either when the gears 71 and 73 are in mesh or the gears 72 and 74. When the clutch 75 is shifted to reversing position the sleeve 78 is of course released from the driving shaft 57. 93 designates a guide for the shifting member 68.

The mechanism illustrated in Fig. 5 is of a more simple and direct character than that described in connection with the preceding figures, but it will be understood that in said Fig. 5 in all forward speeds, the driven shaft 58 is rotated in the opposite direction from the driving shaft 57 except in reverse gear.

I claim:—

1. Transmission gearing embodying in combination, a driving shaft, a driven shaft in spaced relation thereto, a series of connected gears normally loose on the driving shaft and mounted to rotate in unison, other gears fast on the driven shaft, a clutch on the driving shaft for connecting the first named gears to and disconnecting the same from the driving shaft, motion transmitting gears shiftable to and from operative positions between the respective gears on the driving and driven shafts, a speed governor on the driven shaft, a gear shifting member actuated by said governor, and means interposed between the last named member and the clutch, whereby the clutch is automatically released during the gear shifting operation.

2. Transmission gearing embodying in combination, a driving shaft, a driven shaft in spaced relation thereto, a series of connected gears normally loose on the driving shaft and mounted to rotate in unison, other gears fast on the driven shaft, a clutch on the driving shaft for connecting the first named gears to and disconnecting the same from the driving shaft, motion transmitting gears shiftable to and from operative positions between the respective gears on the driving and driven shafts, a speed governor on the driven shaft, a gear shifting member actuated by said governor, means interposed between the last named member and the clutch, whereby the clutch is automatically released during the gear shifting operation, and means for throwing the clutch into operation after the gear shifting operation has been completed.

3. Transmission gearing embodying in combination, a driving shaft, a driven shaft in spaced relation thereto, a series of connected gears normally loose on the driving shaft and mounted to rotate in unison, other gears fast on the driven shaft, a clutch on the driving shaft for connecting the first named gears to and disconnecting the same from the driving shaft, motion transmitting gears shiftable to and from operative positions between the respective gears on the driving and driven shafts, a speed governor on the driven shaft, a gear shifting member actuated by said governor, shiftable supports by which said motion-transmitting gears are moved into and out of their operative positions actuated by said gear shifting member, and means interposed between the last named member and the clutch, whereby the clutch is automatically released during the gear shifting operation.

4. Transmission gearing embodying in combination, a driving shaft, a driven shaft in spaced relation thereto, a series of connected gears normally loose on the driving shaft and mounted to rotate in unison, other gears fast on the driven shaft, a clutch on the driving shaft for connecting the first named gears to and disconnecting the same from the driving shaft, motion transmitting gears shiftable to and from operative positions between the respective gears on the driving and driven shafts, a speed governor on the driven shaft, a gear shifting member actuated by said governor, means interposed between the last named member and the clutch, whereby the clutch is automatically released during the gear shifting operation, and means for limiting the operation of the governor in relation to the gear shifting member when the high speed gears are engaged.

5. Transmission gearing embodying in combination, a driving shaft, a driven shaft in spaced relation thereto, a series of connected gears normally loose on the driving shaft and mounted to rotate in unison, other gears fast on the driven shaft, a clutch on the driving shaft for connecting the first named gears to and disconnecting the same from the driving shaft, motion transmitting gears shiftable to and from operative positions between the respective gears on the driving and driven shafts, a speed governor on the driven shaft, a gear shifting member actuated by said governor, means interposed between the last named member and the clutch, whereby the clutch is automatically released during the gear shifting operation, a clutch shifting lever, and means on said gear shifting member for actuating said clutch shifting lever to release the clutch for the purpose set forth.

6. Transmission gearing embodying in combination, a driving shaft, a driven shaft in spaced relation thereto, a series of connected gears normally loose on the driving shaft, other gears fast on the driven shaft, a clutch on the driving shaft for connecting the first named gears to and disconnecting the same from the driving shaft, a speed governor on the driven shaft, and a gear shifting member actuated by said governor.

7. Transmission gearing embodying in combination, a driving shaft, a driven shaft in spaced relation thereto, a series of connected gears normally loose on the driving shaft, other gears fast on the driven shaft, a clutch on the driving shaft for connecting the first named gears to and disconnecting the same from the driving shaft, a speed governor on the driven shaft, a gear shifting member actuated by said governor, and means interposed between the last named member and the clutch whereby the clutch is automatically released during the gear shifting operation.

8. Transmission gearing embodying in combination, a driving shaft, a driven shaft, a series of gears connectible to the driving shaft, other gears on the driven shaft, a clutch for connecting the first named gears to the driving shaft, a speed governor actuated by the driven shaft, and a gear shifting member actuated by said governor.

9. Transmission gearing embodying in combination, a driving shaft, a driven shaft, a series of gears connectible to the driving shaft, other gears on the driven shaft, a clutch for connecting the first named gears to the driving shaft, a speed governor actuated by the driven shaft, a gear shifting member actuated by said governor, and means interposed between the last named member and the clutch whereby the clutch is automatically released during the gear shifting operation.

10. Transmission gearing embodying in combination, a driving shaft, a driven shaft, a series of gears connectible to the driving shaft, other gears on the driven shaft, a clutch for connecting the first named gears to the driving shaft, a speed governor actuated by the driven shaft, a gear shifting member actuated by said governor, and a clutch shifting lever actuated and controlled by said gear shifting member.

11. Transmission gearing embodying in combination, a driving shaft, a driven shaft, a series of gears connectible to the driving shaft, other gears on the driven shaft, a clutch for connecting the first named gears to the driving shaft, a speed governor actuated by the driven shaft, a gear shifting member actuated by said governor, a clutch shifting lever, and means between said lever and the gear shifting member, whereby said clutch is released during the gear shifting operation.

12. Transmission gearing embodying in combination, a driving shaft, a driven shaft, a series of gears connectible to the driving shaft, other gears on the driven shaft, a clutch for connecting the first named gears to the driving shaft, a speed governor actuated by the driven shaft, a gear shifting member actuated by said governor, means interposed between the last named member and the clutch whereby the clutch is automatically released during the gear shifting operation, and means for throwing the clutch into operation after the gear shifting operation has been completed.

13. Transmission gearing embodying in combination, a driving shaft, a driven shaft, a series of gears connectible to the driving shaft, other gears on the driven shaft, a clutch for connecting the first named gears to the driving shaft, a speed governor actuated by the driven shaft, a gear shifting member actuated by said governor, and motion transmitting gears shiftable to and from operative positions between the respective gears of the driving and driven shafts and actuated by said gear shifting member.

14. Transmission gearing embodying in combination, a driving shaft, a driven shaft, a series of gears connectible to the driving shaft, other gears on the driven shaft, a clutch for connecting the first named gears to the driving shaft, a speed governor actuated by the driven shaft, a gear shifting member actuated by said governor, motion transmitting gears shiftable to and from operative positions between the respective gears of the driving and driven shafts, and shiftable supports by which said motion transmitting gears are moved into and out of their operative positions actuated by said gear shifting member.

15. Transmission gearing embodying in combination, a driving shaft, a driven shaft, a series of gears connectible to the driving shaft, other gears on the driven shaft, a clutch for connecting the first named gears to the driving shaft, a speed governor actuated by the driven shaft, a gear shifting member actuated by said governor, and means for limiting the operation of the governor in relation to the gear shifting member when the high speed gears are engaged.

In testimony whereof I affix my signature in presence of two witnesses.

CLAUDE R. FOUNTAIN.

Witnesses:
C. U. KRIEG, Sr.,
J. W. GRAHAM.